Figure 1:
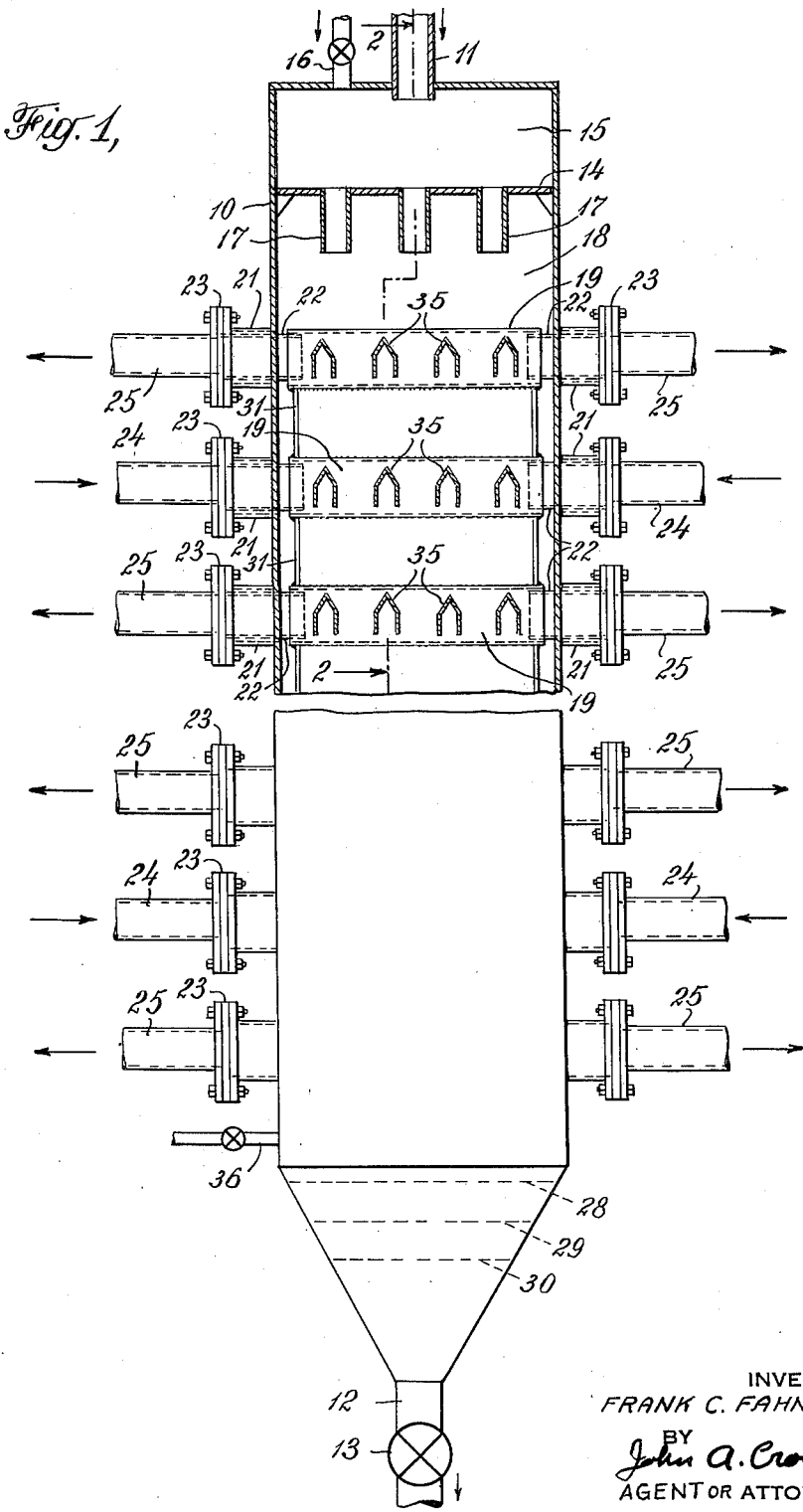

Feb. 28, 1950 — F. C. FAHNESTOCK — 2,499,305
APPARATUS FOR GASEOUS CONVERSIONS IN PRESENCE
OF A MOVING CONTACT MATERIAL
Filed May 22, 1946 — 2 Sheets-Sheet 2

INVENTOR
FRANK C. FAHNESTOCK
BY John A. Crowley, Jr.
AGENT OR ATTORNEY

Patented Feb. 28, 1950

2,499,305

UNITED STATES PATENT OFFICE 2,499,305

APPARATUS FOR GASEOUS CONVERSIONS IN PRESENCE OF A MOVING CONTACT MATERIAL

Frank C. Fahnestock, Manhasset, N. Y., assignor to Socony-Vacuum Oil Company, Incorporated, a corporation of New York Application May 22, 1946, Serial No. 671,573

4 Claims. (Cl. 23—288)

This invention has to do with apparatus for contacting gaseous materials with moving masses of particle form solids for any of a number of purposes. Exemplary of such purposes are gas adsorption, gas purification, gas-solid heat exchange, solid treatment and catalytic conversion operations. Typical of such catalytic conversion operations is the catalytic conversion of hydrocarbons, it being well known that hydrocarbons of gas oil nature boiling between about 450–800° F. may be converted to gasoline and other products by subjecting such gas oil to a particle form solid adsorbent material at temperatures of the order of 800° F. and usually at super-atmospheric pressures. In a recent form this process has been developed as one wherein the contact material is passed cyclically through a reaction zone wherein it flows as a substantially compact column of solid particles while being contacted with hydrocarbons in the gaseous phase to effect the conversion thereof and through a regeneration zone wherein it flows as a substantially compact column of solid particles while being contacted with a combustion supporting gas, such as air acting to burn off of the contact material a carbonaceous contaminant deposited thereon during the hydrocarbon conversion. The contact material may take the form of natural or treated clays, bauxites, alumina, or certain synthetic associations of silica, alumina or silica and alumina to which small percentages of other materials such as metallic oxides may be added for special purposes. Such contact materials may range in particle size from about 4 to 100 mesh and should preferably fall within the range 4–30 mesh by Tyler standard screen analysis.

This invention has specifically to do with details of construction in connection with reactors and regenerators wherein fluid reactants are brought into contact with a moving compact stream of particle form contact material. Inasmuch as both reactor and regenerator are alike in this fundamental operation, the term reactor will be used hereinafter in the explanation and claiming of the invention in a sense sufficiently broad to include fluid-solid contact apparatus regardless of exact purposes of use.

A major object of this invention is the provision of a reaction vessel for the conversion of gaseous material in the presence of a substantially compact column of contact material particles of improved structure for distribution of gaseous reactants into and collecting of gaseous reactants from a moving column of contact material without interference with the steady and uniform movement of the contact material.

Another object is the provision in a multistage reactor for conversion of fluid reactants in the presence of a substantially compact column of downwardly moving contact material particles of improved gas handling structure. These and other objects of this invention will become apparent from the following description thereof.

Figure 2:
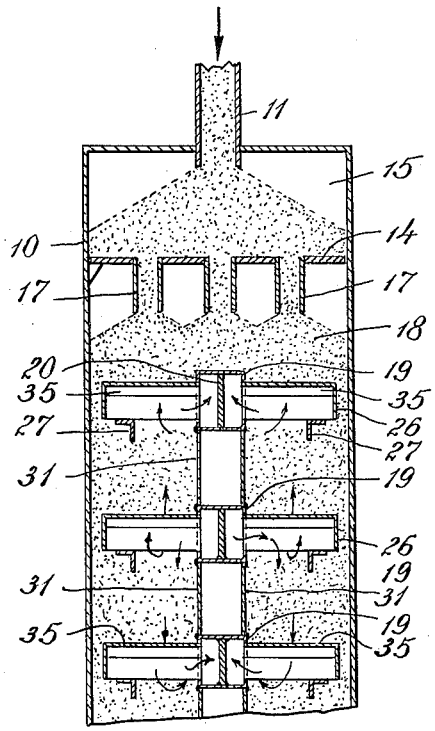
Figure 3:
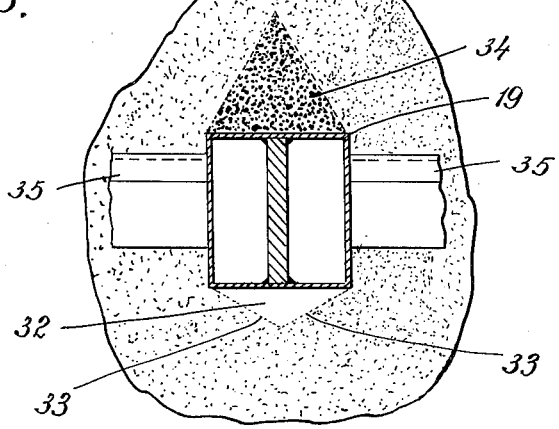

The invention may be more readily understood by reference to the drawings attached hereto of which Figure 1 is a vertical view, partially in section, showing a preferred form of the apparatus of the invention and Figure 2 is a sectional view of part of the apparatus of Figure 1, taken along line 2—2 of Figure 1. Figure 3 is a detailed view of only a part of the invention used for the purposes of discussion. All of these drawings are highly diagrammatic in form.

Turning now to Figures 1 and 2 which may be best considered together, there is shown a reactor 10 having a solid inlet conduit 11 at its upper end and a solid outlet conduit 12, bearing a flow control valve 13 at its lower end. Across the upper section of the reactor extends a partition 14 defining a seal and solid surge chamber 15 in the upper end of the reactor. A seal gas inlet 16 is provided for the seal chamber. Uniformly spaced tubes 17 depend from partition 14 for passage of solid material from the seal chamber to the reaction zone 18 therebelow. Centrally disposed in the vessel 10 is a vertical row of vertically spaced apart horizontally extending manifold members 19. These members may take any of a number of forms but a preferable form is one wherein the cross-sectional shape is rectangular so as to provide a box-type manifold having a stiffening member 20 disposed substantially centrally therein. The manifolds may be supported within the vessel in any of a number of manners conventional to the art. A preferred method of support, however, is the provision of flanged nozzle 21 connected to the vessel wall opposite each end of each manifold and the provision of flanged sleeves 22 which slide through the nozzles 21 and extend a short distance into the manifolds at their ends. Each sleeve is rigidly supported by means of its flange 23 held tightly between a flanged nozzle 21 and a flanged inlet conduit 24 or outlet conduit 25. By this construction the fluid inlet and outlet conduits are placed in gas flow communication with the interior of the manifolds within the vessel through the sleeves 22. Moreover, the sleeves on each end of each manifold may serve as a flexible support therefor. Gas communication with the exterior may be provided through both ends of each manifold in the manner shown, or a blank flange may be provided to block and support the sleeve on one end and a gas flow conduit provided only for one end of each manifold. Connected perpendicularly through the two opposite side walls of each manifold are a plurality of horizontally spaced horizontally extending gas handling members 35. These members may take any of a number of constructional forms which will adapt them to distribute gas into or collect gas from the contact material column. In a preferred form they may consist of inverted gable-roofed troughs. As shown, these troughs terminate near opposite walls of the vessel, their ends being closed with plates 26. On their open opposite ends the troughs are in communication with the interior of the manifold 19. Support angles 27, supported themselves from the vessel wall may be provided under the troughs 35.

In operation particle form contact material is introduced through conduit 11 into the surge or seal chamber 15 from which it flows through tubes 17 into the reaction zone. Contact material is withdrawn from the lower end of the vessel 10 through conduit 12 at a rate controlled by valve 13 such as will maintain the reaction zone substantially filled with a substantially compact column of downwardly flowing particle form contact material. The flow of contact material is maintained substantially uniform in all portions of the reaction zone cross-section by means of a partition and orifice arrangement indicated by the dotted lines 28—30 inclusive in the lower section of vessel 10. Fluid reactants may be supplied separately to each of the inlet conduits 24 or the inlet conduits may be all connected into a common feeder manifold (not shown). Fluid reactants pass from each inlet conduit 24 through sleeves 22 into the distributing manifolds 19 within the vessel. It will be noted that alternate manifolds are distributing manifolds. Fluid reactant is distributed by each distributing manifold under the several horizontally extending inverted troughs connected thereinto. The fluid reactant passes out from under these troughs into the column of contact material. The fluid from each level of distributing troughs passes in part upwardly through the contact material column to the row of collecting troughs thereabove and in part downwardly to the row of collecting troughs therebelow. Reactant fluid passes under the collector troughs at each level and then into collecting manifolds 19 from which it is withdrawn through sleeves 22 and outlet conduits 25. It will be understood that in other constructions within the scope of this invention, the arrangement of fluid inlets and outlets may be varied to permit other types of reactant flow through the contact material. For example, the inlets and outlets may be so chosen as to provide for independent upward flow of reactant fluid between inlets and outlets in a plurality of superposed zones. In those operations wherein escape of reactant fluid through the solid inlet and outlet conduits is objectionable, such escape may be prevented by introduction of an inert gas such as steam or flue gas through conduit 16 into chamber 15 at a sufficient rate to maintain a seal gas pressure in chamber 15 above the reactant fluid pressure in the upper section of the reaction zone. Also a similar seal or purge gas may be introduced through conduit 36 near the bottom of the vessel 22.

Also provided in the construction shown in Figures 1 and 2 are partitions positioned vertically between adjacent manifolds 19. The purpose of these partitions will now be explained. Looking at Figure 3, there is shown a sectional view of one of the manifolds 19 and the solid flow that would occur in the absence of partition 31. Due to its normal angle of repose, the downwardly moving solid particles would flow under each manifold 19 in such a manner as to define a substantial void space 32 defined by the bottom of the manifold 19 and the surface of the contact mass indicated by the dotted lines 33. Moreover, above each manifold 19 there exists a dead zone 34 of substantially no solid flow which zone is determined by the angle of internal flow of the solid particles involved. It will be apparent that the void zones give rise to a central section through the vessel 22 wherein the contact material bed depth between adjacent gas distributor and collector assemblies is substantially less than it is in other sections of the vessel. This gives rise to a non-uniform rate of gas flow through various sections of the column cross-sectional area in vessel 10. Moreover, the dead zone 34 causes the over-exposure to reactant fluid of a portion of the contact material flow through the vessel. It has also been found that the manifolds interfere with the steady and uniform flow of the contact material. Instead of the contact material column moving at a steady uniform rate, it has been found to move in "bumps" or sudden downward jerks in which the surface of the column may suddenly drop away from the outlets of the feeder pipes 17. This irregular and unsteady type of solid flow gives rise to solid feeding difficulties such as bridging of the feed particles in the feed pipes. Moreover, the "bumps" set up serious vibrations which cause loosening of the apparatus and support steel joints. The exact manner in which the manifolds 19 give rise to this unsteady flow is not entirely understood, but it is probably due to a combination of causes such as excessive rate of gas flow in the section of the column vertically between manifolds and sudden rises and falls in the solid material surface level 33 under the manifolds. It has been found that the provision of partitions 31 extending vertically between adjacent manifolds overcomes the unsteady solid flow caused by manifolds 19, eliminates the dead zones wherein contact material may be over-exposed to reactant fluids and promotes more uniform reactant fluid rates of flow in all sections of the column cross-sectional area within the reaction zone.

It will be understood that the specific details of construction and apparatus application given hereinabove are exemplary and are not intended as limiting the scope of this invention except as it is limited by the following claims.

I claim:

1. In a gas-solid contacting vessel of the type described, a gas handling structure comprising: manifold members disposed transversely and substantially centrally across said vessel at a plurality of spaced levels within said vessel, members positioned within said vessel vertically between the adjacent manifold members adapted to block off from the rest of said vessel substantially all of the space lying vertically between adjacent manifold members, a plurality of horizontally extending gas handling members connected in gas flow communication with each manifolding member at spaced intervals along its length, the interior of said gas handling members being in gas flow communication with the interior of said vessel, and means communicating the interior of each manifolding member with the space exterior of said vessel.

2. A gas-solid contacting apparatus comprising: a substantially vertical vessel having a solid inlet at its upper end and a solid outlet at its lower end, a centrally disposed vertical row of vertically spaced apart closed fluid manifold members within said vessel, each member extending transversely across said vessel, the lowermost manifold being spaced substantially above the lower end of said vessel and the uppermost manifold being spaced substantially below the upper end of said vessel, partitioning extending vertically between only adjacent manifold members adapted to close off from the remainder of the vessel substantially all that space lying between and laterally in line with adjacent vertically spaced manifold members, a plurality of sub-inverted, horizontally disposed trough members connected substantially perpendicularly to each manifold member at spaced horizontal intervals along the length thereof, and means communicating the interior of each manifolding member with the space exterior of said vessel.

3. In a vessel for conducting reactions involving gaseous reactants in the presence of a substantially compact column of particle form contact material, a reactant fluid handling structure comprising: a centrally disposed vertical row of vertically spaced apart box-type fluid manifolds, each manifold extending horizontally across said vessel, blocking members positioned within said vessel vertically between the adjacent manifold members adapted to block off substantially all of the space lying between adjacent vertically spaced manifold members and within the vertical projection of the horizontal cross-sectional areas of said adjacent manifolds, a plurality of horizontally spaced apart inverted, gable roof trough members connected perpendicularly to the two opposite longitudinal sides of each manifold and extending substantially to the vessel wall on either side of said manifold, means to admit fluid reactant to selected alternate manifolds and means to withdraw fluid reactant products from the remaining alternate manifolds.

4. An apparatus for conducting reactions involving a gaseous reactant in the presence of a substantially compact column of moving contact material particles which comprises: a substantially vertical reaction vessel, means to supply contact material to the upper end of said vessel and means to withdraw contact material at a controlled rate from the lower end of said vessel, a centrally disposed vertical row of vertically spaced apart, parallel, box-type manifolds within said vessel, each manifold extending substantially horizontally across said vessel, the uppermost manifold being spaced substantially below said contact material supply means and the lowermost manifold being spaced substantially above said contact material withdrawal means, bulkheads positioned vertically only between adjacent manifolds and arranged to close off substantially all the space lying between and laterally within the vertical projection of the horizontal areas of said manifolds, whereby solid flow is excluded from the space between adjacent manifolds, a plurality of horizontally spaced apart inverted, gable roof trough members connected perpendicularly to the two opposite longitudinal sides of each manifold and extending substantially to the vessel wall on either side of said manifold, means to admit fluid reactant to selected alternate manifolds and means to withdraw fluid reactant products from the remaining alternate manifolds.

FRANK C. FAHNESTOCK.

REFERENCES CITED

The following references are of record in the file of this patent:

UNITED STATES PATENTS

| Number | Name | Date |
|---|---|---|
| 1,028,899 | Morris | June 11, 1912 |

OTHER REFERENCES

"Houdry Pioneer," vol. 1, No. 1, September 1945, p. 3.